United States Patent
Van De Ven

(10) Patent No.: US 9,015,461 B2
(45) Date of Patent: *Apr. 21, 2015

(54) BOOTING AN OPERATING SYSTEM OF A SYSTEM USING A READ AHEAD TECHNIQUE

(75) Inventor: Adriaan Van De Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 13/114,568

(22) Filed: May 24, 2011

(65) Prior Publication Data

US 2011/0225412 A1    Sep. 15, 2011

Related U.S. Application Data

(63) Continuation of application No. 12/426,582, filed on Apr. 20, 2009, now Pat. No. 8,230,208.

(51) Int. Cl.
  *G06F 15/177*   (2006.01)
  *G06F 9/44*     (2006.01)

(52) U.S. Cl.
  CPC .................................... *G06F 9/4406* (2013.01)

(58) Field of Classification Search
  CPC .............................. G06F 9/4401; G06F 9/4406
  USPC .......................................... 713/1, 2; 711/101
  See application file for complete search history.

(56) References Cited

U.S. PATENT DOCUMENTS

| | | | |
|---|---|---|---|
| 5,675,795 A * | 10/1997 | Rawson et al. | 713/2 |
| 6,920,533 B2 | 7/2005 | Coulson et al. | |
| 7,409,537 B2 | 8/2008 | Tsang | |
| 7,447,888 B2 * | 11/2008 | Du et al. | 713/1 |
| 7,676,671 B2 | 3/2010 | Van Rooyen | |

(Continued)

FOREIGN PATENT DOCUMENTS

| | | |
|---|---|---|
| JP | 2006-126987 A | 5/2006 |
| JP | 2006-155391 A | 6/2006 |
| JP | 2007-179089 A | 7/2007 |

(Continued)

OTHER PUBLICATIONS

Office Action Received for European Patent Application No. 10250646.6 mailed on Dec. 23, 2010, 7 pages of Office Action.

(Continued)

*Primary Examiner* — Thuan Du
(74) *Attorney, Agent, or Firm* — Grossman, Tucker, Perreault & Pfleger, PLLC

(57) ABSTRACT

In one embodiment, the present invention includes a method for generating a list of files accessed during an operating system (OS) boot process to profile the OS boot process, and optimizing the list of files to generate an optimized file list for use in future OS boot processes, where the optimizing is according to a first optimization technique if the files were accessed from a solid state medium and according to a second optimization technique if the files were accessed from a rotating medium. Other embodiments are described and claimed.

22 Claims, 5 Drawing Sheets

(56) References Cited

U.S. PATENT DOCUMENTS

| | | | |
|---|---|---|---|
| 8,151,102 B2 * | 4/2012 | Itoh | 713/2 |
| 2002/0091917 A1 | 7/2002 | Liao | |
| 2007/0038850 A1 | 2/2007 | Matthews et al. | |
| 2008/0082812 A1 | 4/2008 | Kirshenbaum et al. | |
| 2008/0256295 A1 | 10/2008 | Lambert et al. | |
| 2011/0119756 A1 | 5/2011 | McClusky et al. | |

FOREIGN PATENT DOCUMENTS

| | | |
|---|---|---|
| JP | 2009-050793 A | 3/2009 |
| WO | 2005/071538 A1 | 8/2005 |

OTHER PUBLICATIONS

Office Action Received for Japanese Patent Application No. 2010-090099, mailed on May 8, 2012, 2 Pages of Japanese Office Action and 3 Pages of English Translation.

Office Action Received for Chinese Patent Application No. 201010165549.8, mailed on Jun. 19, 2013, 3 Pages of Chinese Office Action and 4 Pages of English Translation.

Office Action Received for Chinese Patent Application No. 201010165549.8, mailed on Sep. 25, 2012, 8 pages of Chinese Office Action and 8 Pages of English translation.

Office Action received for European Patent Application No. 10250646.6, mailed on Apr. 16, 2014, 8 pages.

* cited by examiner

BOOTING AN OPERATING SYSTEM OF A SYSTEM USING A READ AHEAD TECHNIQUE

CROSS-REFERENCE TO RELATED APPLICATION

This application is a Continuation of U.S. patent application Ser. No. 12/426,582, filed on Apr. 20, 2009, and entitled "BOOTING AN OPERATING SYSTEM OF A SYSTEM USING A READ AHEAD TECHNIQUE". This application is incorporated herein by reference in its entirety.

BACKGROUND

Computer systems are formed from a collection of hardware, firmware and software. Typically, a computer system includes one or more processors, memory, peripheral and input/output (IO) devices and so forth. Various user applications execute on the computer system under control and using system services of an operating system (OS). Example operating systems include Linux™ and Windows™ operating systems.

Before a user can begin using a computer system, a boot process is performed upon the power up of the system such that the OS kernel, which is the main functionality of the operating system, can be initiated. In typical systems before an operating system boot, normally a basic input/output system (BIOS) firmware is executed to perform various self-test and other functions, which then passes off control to an OS boot loader, which is a part of the operating system that is used to load various kernel items needed to enable various system functionality, including providing graphics capability to thus initiate a display to enable the user to log in.

System startup speed is one of the factors users consider when describing how fast a computer system is. With the ever increasing bloat of OS software, the boot time for the OS is impacted, causing delays that are undesirable to a user.

DETAILED DESCRIPTION

In various embodiments, a system startup manager, which may be part of an OS kernel, may include various sub-functions to enable an efficient OS launch. In one such embodiment, the system startup manager may include a read ahead profile collector, a profile optimizer, a data read ahead agent, and a process launcher. However, understand that different functionalities may be provided in various embodiments. Furthermore, understand that in different implementations, each of these sub-functions may be performed by one or more different components. Furthermore, each execution of a system startup manager need not perform all functions. Thus the profile and optimization functions may be executed sparingly.

For example, such functions may be executed upon an initial power up of a system to generate and optimize a list of files to be executed during the OS boot. Then these functions need not be performed on each powering of a system. Instead, in various embodiments these functions may only be further performed upon an update to the system. Different levels of updates may trigger these functions to be performed. For example, some implementations may trigger these functions only on a major update such as an OS service pack update. However, other implementations may more routinely perform these functions on more minor updates such as a security update.

As described above, in various embodiments a system startup manager can be part of an OS kernel. Of course, the scope of the present invention is not limited in this regard, and other implementations may be performed in user-level space. For better understanding the context in which the system startup manager operates, reference is made to FIG. 1, which is a block diagram of a computer system in accordance with an embodiment of the present invention.

Figure 1:
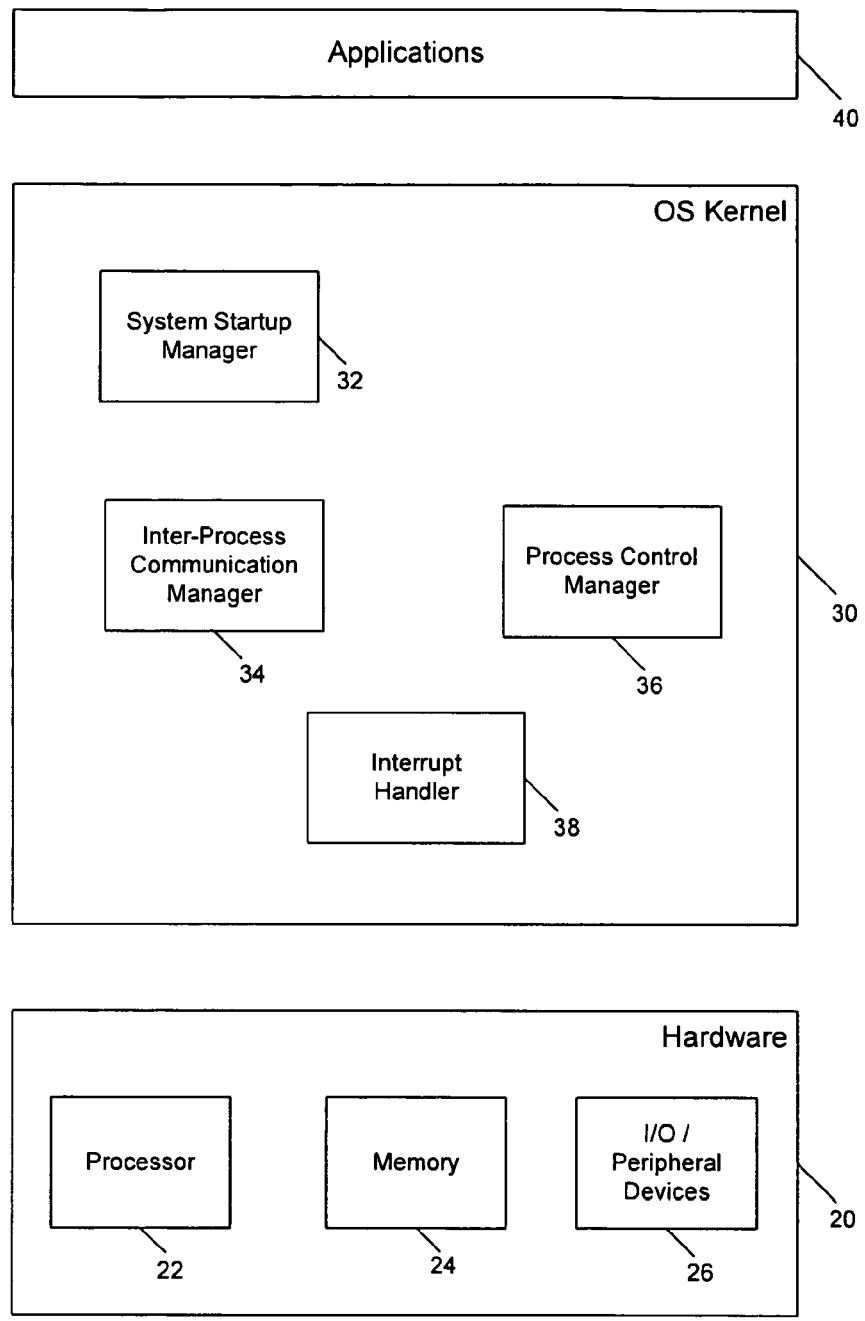
FIG. 1 is a block diagram of a computer system in accordance with an embodiment of the present invention.

As shown in FIG. 1, computer system 10 is abstracted to include various layers including hardware 20, OS kernel 30, and applications 40, which may be various user-level software applications that execute on hardware 20 using various functions of OS kernel 30. As seen in FIG. 1, hardware 20 may include a processor 22, which may be one or more multicore processors, for example. Processor 22 may be coupled to a memory 24, which may be a volatile memory such as a dynamic random access memory (DRAM) and which may function as an OS disk cache, as will be discussed further below. In addition, one or more input/output (IO)/peripheral devices 26 may be present including, for example, a display, a network interface, mass storage such as a rotating disk (e.g., a hard drive) or a solid state disk (SSD). While shown with these limited hardware components, understand that many other such components may be present in a representative system.

Various operations may be performed using hardware 20 under control of OS kernel 30. In general, OS kernel 30 may perform various functions requested by the system or applications 40. To enable a startup in accordance with an embodiment of the present invention, a system startup manager 32 may be present. In addition, various other managers and control modules may be present in OS kernel 30. Representative examples include an inter-process communication manager 34, a process control manager 36, which may be used to create, destroy and operate on various processes. In addition, an interrupt handler 38 may be used to respond to various interrupts received from hardware or software. Of course, OS kernel 30 may include many more such components. Applications 40 may include various user-level applications that execute using OS kernel 30. While shown with this particular example, in FIG. 1, the scope of the present invention is not limited in this regard.

As discussed above, in one embodiment system startup manager 32 may include a profile collector, a profile optimizer, a read ahead agent, and a process launcher. In general, the task of the system startup manager is to bring the system from a status of "the operating system kernel has started" to a status of "ready for full user interaction." As examples, this OS kernel launch may include plumbing tasks like checking and mounting file systems and starting various processes that perform background and critical tasks. Example tasks on a Linux OS may include launching an X server, various daemons, or so forth.

Figure 2:
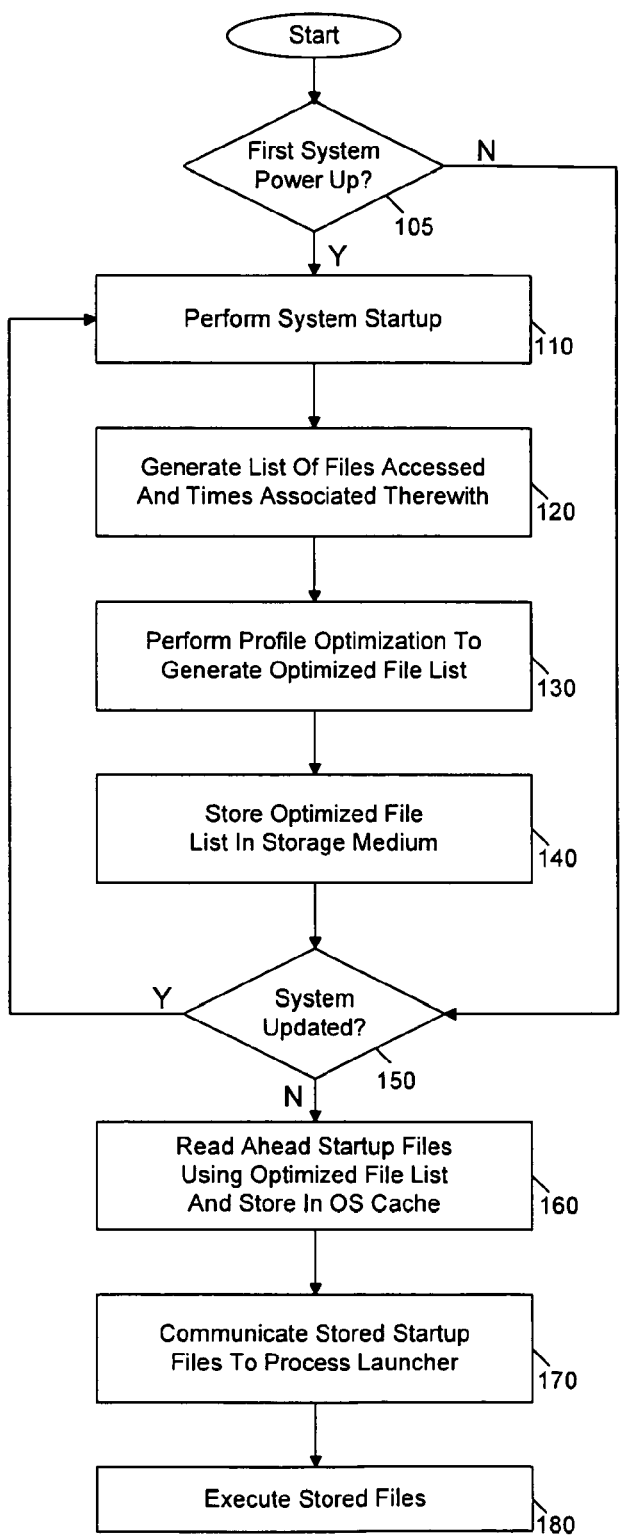
FIG. 2 is a flow diagram of an overall method of performing a system startup in accordance with an embodiment of the present invention.

Referring now to FIG. 2, shown is a flow diagram of an overall method of performing a system startup in accordance with an embodiment of the present invention. More specifically, method 100 may be used to perform an initial profiling run and optimization, as well as additional startups after such optimization. As seen, first it may be determined on system startup whether this is the first power up of a system (diamond 105). For example, this determination may take the form of checking an indicator (e.g., present as a flag on the file system, or by the absence of a previously prepared read ahead list) that indicates whether the system has been previously powered up. If so, control passes to block 110 where a system startup may be performed. Such startup may be a conventional startup in which files are obtained from memory using disk accesses and provided to a process launcher to execute the files to launch various processes. During such system startup, a list of files may be generated (block 120). More specifically this system startup may be a profiling collection in which this list is generated. In one embodiment, the list may include both file identifiers and a time indicator associated with each file. As examples, the time indicator may be a measurement in time (e.g., in milliseconds (ms)) from beginning of the system startup, or it may be a sequence number providing the order in which files are launched using the process launcher. In either event, the list thus provides file identifiers as well as an indication of the sequential order in which the files were executed.

Then, a profile optimization may be performed to generate an optimized file list (block 130). As will be discussed further below, such optimization may aim to reduce seek times needed for obtaining the files from their location in storage. This optimized file list may then be stored in a storage medium (block 140). For example, the optimized file list may be stored in the same storage medium that includes the OS files, e.g., a mass storage device such as a disk drive or solid state disk. At this point, the optimization is completed and normal OS operations may occur.

Thereafter upon other power ups of the system it may be determined whether the system has been updated (diamond 150). Different types of updates may cause this determination to be met in this regard. For example as discussed above only a major system update such as a new service pack may trigger this determination, while in other implementations a less significant update may trigger the determination. If an update is determined to have occurred, control passes back to block 110, discussed above. Otherwise, control passes to block 160 where a read ahead agent may perform a read ahead of startup files using the optimized file list. When a given amount of such files have been successfully read ahead into OS disk cache space, control passes to block 170 where a communication may be made to a process launcher that such startup files are present. This enables the process launcher to execute the startup files directly from the OS cache, without needing to request the files from mass storage (block 180). Note that the operations of blocks 160, 170 and 180 may be performed iteratively and in parallel until the OS kernel has been fully booted. While shown with this particular implementation in the embodiment of FIG. 2, the scope of the present invention is not limited in this regard.

Further details of the various operations performed by the components of a system startup manager are now described. In a profile collection run which occurs on initial system startup (as well as after certain updates), a profile is collected by the read ahead profile collector component that records which files are used and at what time during the boot process.

During the profile optimization phase, which is performed by the profile optimizer, the recorded profile is transformed into an optimal dataset for future use. Specifically, the profile optimizer detects if the system is running a solid state disk (SSD) (no seek times) or if the system has rotating storage (significant seek times). For the "no seek times" case, the profile optimization phase includes sorting the list of files from the profile by first use, as well as detecting which portions of the files have been actually used. For the SSD case, an optimized file list may be generated that includes an identification of files used during the OS boot, as well as an indication of the portions of these files used. Furthermore, this list may be sorted according to time of first use, i.e., sequentially.

For the rotating storage scenario, in addition to these operations, more extensive work is done to deal with the physical constraints of such rotating storage, namely seek time. In the rotating scenario, the file list from the profile is first sorted by time of first use. That is, the original list is re-cast into an ordered list based on first use. This sorted list is then split into buckets that either represent a fixed amount of time during the boot (e.g., 1 second), or that represent a fixed amount of data read from the disk. Then the contents of each of these buckets can be optimized to reduce the number of seeks by sorting the files in the bucket by the starting sector number of the file.

Note that during this process, the optimizer may further scan the entire list to determine whether any files that are accessed during the boot process (but may be present in another bucket) are co-located with any files in the current bucket being optimized. If so, such files may be added to the current bucket, to reduce the number of disk accesses. While the scope of the present invention is not limited in this regard, whether two files are considered to be co-located may vary based on their distance from each other. In some embodiments, such co-location may correspond to sharing the same track or being in adjacent sectors. Thus although a given file is to be accessed by the process launcher with a later bucket's files, due to its co-location it will be effectively prefetched into the OS disk cache early.

The result of this two-phase sorting is that the file list is sorted by time on a coarse-grained level, but within these coarse-grained buckets, the file list is sorted to reduce seek times. The resulting optimized file list may further include certain metadata regarding the files. For example in this optimized file list data structure (which can be stored on the same storage medium on which the OS files are stored) the boundaries between the buckets can be marked. In addition, "files of interest" are marked specially as well. These "files of interest" are typically the application binary files (i.e., executable (.exe) files) of the daemons that are to be started during the boot.

Figure 3:
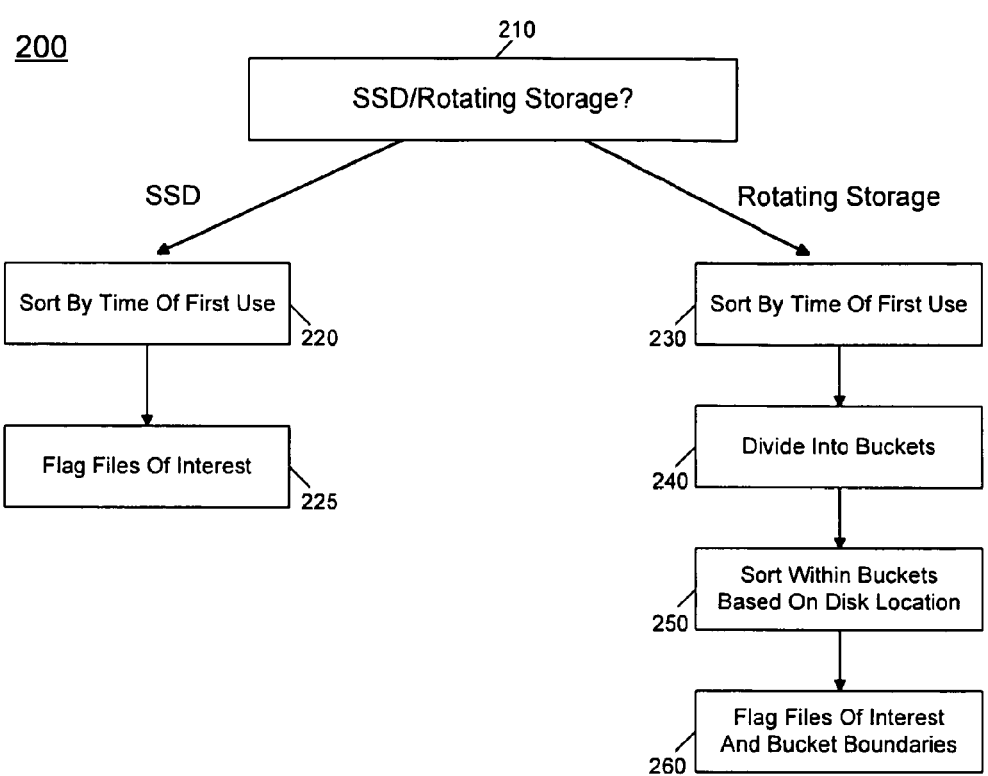
FIG. 3 is a flow diagram of an optimization process in accordance with one embodiment of the present invention.

Referring now to FIG. 3, shown is a flow diagram of an optimization process in accordance with one embodiment of the present invention, and which may be performed by a profile optimizer of a system startup manager of an OS kernel, in some embodiments. As shown in FIG. 3, method 200 may begin by determining whether the OS files are stored on a solid state disk or a rotating storage (block 210). If the files are stored on a solid state disk, control passes to block 220 where the optimization may be performed by sorting the files by time of first use (block 220). In addition, the resulting optimized file list may include metadata such as a flagging of the files of interest (block 225).

If instead a rotating storage is present, control passes to block 230. At block 230 the files may also be sorted by time of first use. However, as seen in FIG. 3, additional optimization operations may be performed. Specifically, the files may be divided into buckets (block 240). These buckets as discussed above may correspond to predetermined amounts of time or data. Then within each of the buckets a sorting may occur based on disk location (block 250). That is, the files may be reordered within a bucket based on the starting sector number. In other implementations, this re-ordering may be based on alphabetical ordering of the file name. Finally, in generating the optimized list, files of interest may be flagged. In addition, boundaries between the buckets may also be marked (block 260). While shown with this particular implementation in the embodiment of FIG. 3, the scope of the present invention is not limited in this regard.

After optimization, the list may be used during regular system startups. Early in the startup, the system startup manager activates a data read ahead agent subcomponent. This data read ahead agent obtains the list from the storage medium and reads the files on this list into the operating system disk cache (which may be a DRAM) one-by-one. In one embodiment, this reading can be done in a multithreaded manner when stored on a SSD storage, and in a single-threaded manner when stored on rotating storage. When the read ahead agent encounters a file of interest it records the completion of the reading into the disk cache in a completion list that is stored in memory. Each time the read ahead agent encounters the end of a bucket, the files of interest that were encountered in the bucket and recorded in the completion list are communicated to the process launcher component. In certain implementations, for the SSD case such communication may not occur.

The process launcher component has a conventional list of applications to start that is stored in memory. While the process launcher still launches files in the order set forth in this list, in various embodiments the process launcher delays launching a process until the read ahead agent has communicated that the file (as well as the rest of the bucket that the file was in) has completed its read ahead task. By introducing this delay, the startup of a process by the process launcher will not actually cause a disk IO (since all the data is in the OS cache by the time the process starts), which avoids the hazard of having such a disk IO disturb the carefully-sorted-to avoid-seeks IO pattern that the read ahead agent is performing. This delay can actually increase the boot performance due to the reality that disks are 10×-50× or more faster in an optimal IO pattern as compared to a disturbed IO pattern.

Figure 4:
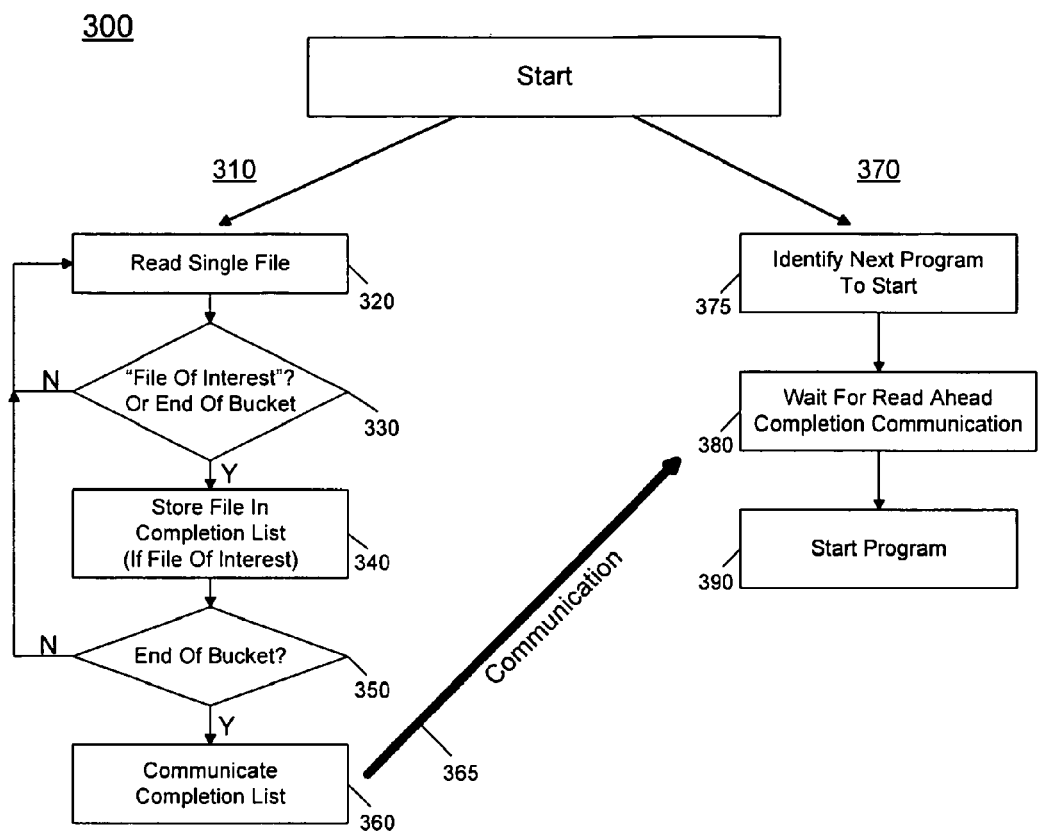
FIG. 4 is a flow diagram of an optimized startup process in accordance with one embodiment of the present invention.

Referring now to FIG. 4, shown is a flow diagram of an optimized startup process in accordance with one embodiment of the present invention. As shown in FIG. 4, method 300 may begin by a generally parallel execution of both a read ahead agent, as shown in the stack represented at 310, and a process launcher, as shown in the stack represented at 370. Note that in general the read ahead agent may first begin execution to start reading files before the process launcher executes, however the scope of the present invention is not limited in this regard.

With reference to the read ahead agent, a single file at a time is read from the OS store, which may be in mass memory, and stored in the OS disk cache (block 320). For each file read and stored in the OS disk cache, it may be determined whether the file is a file of interest or a bucket end (block 330). If not, control passes back to block 320. If the file is a file of interest or represents an end of a bucket, control passes to block 340 where a file indicator is stored in the completion list (if it is a file of interest). If the end of the bucket is determined at block 350, control passes to block 360, where the completion list may be communicated (via communication 365) to the process launcher.

As seen in FIG. 4, the process launcher stack begins by identifying a next program to start (block 375). As discussed above, this may be with reference to a list of files present in or accessed by the process launcher. However, before executing this next program, the process launcher may enter a wait state (block 380) until it has received a communication from the read ahead agent that this program is present in the OS disk cache space. Accordingly, upon receipt of this communication (assuming the file was not already present) the program may be executed (block 390). While shown with this particular implementation in the embodiment of FIG. 4, other embodiments to provide interaction and communication between read ahead agent and process launcher are possible. Embodiments thus provide a smart sorting order, and tie (i.e., prevent) the start of processes/daemons to progress in the read ahead.

Figure 5:
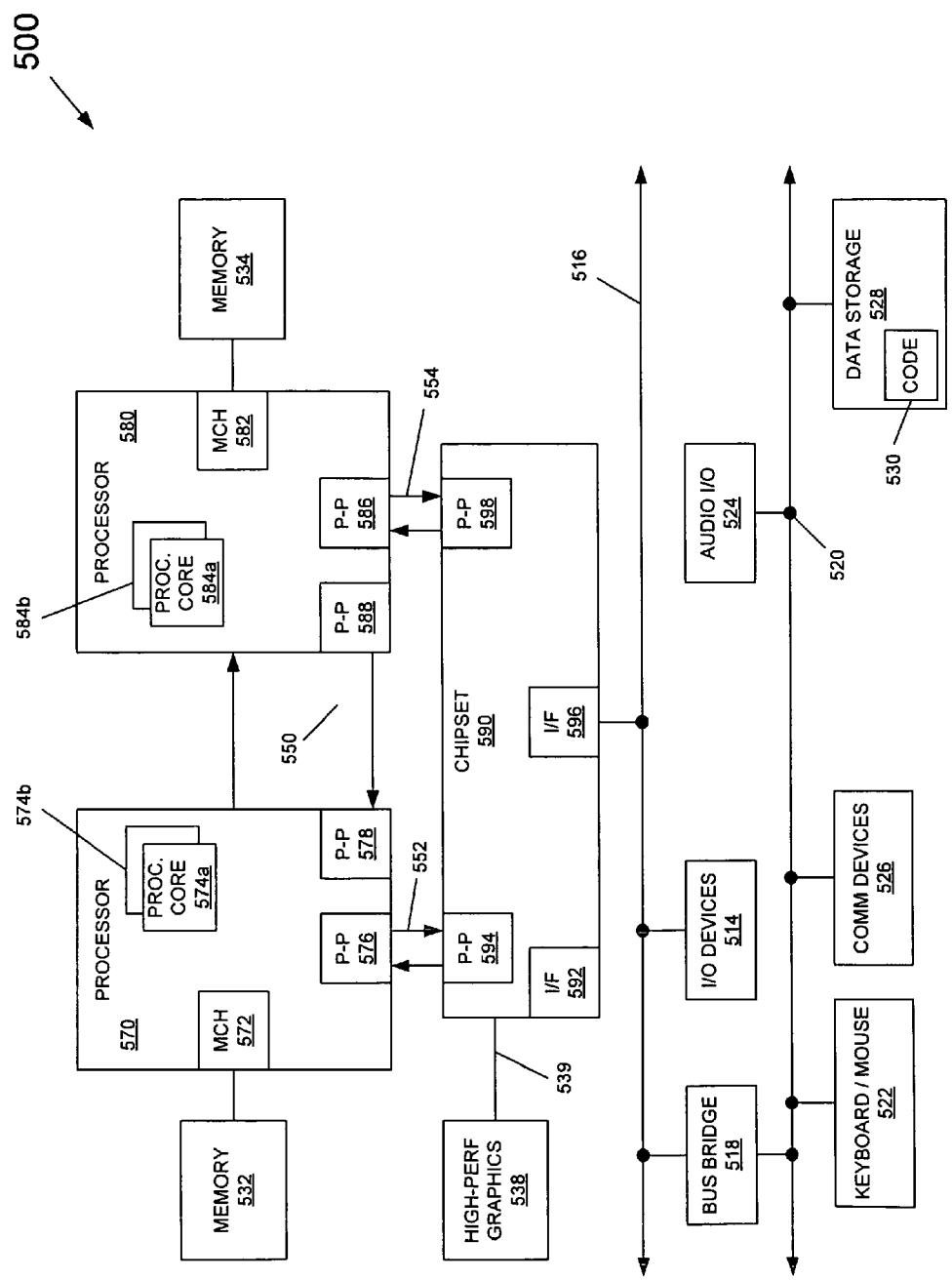
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. The processor cores may boot up one or more OSs on startup that are stored in a mass storage device in accordance with an embodiment of the present invention. Still further, the processors may execute a portion of the OS kernel to perform an optimization of a startup file list in accordance with an embodiment of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors, and which may act as an OS disk cache to store files to be accessed during the boot process. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive which may include code 530, including in one embodiment an OS. Of course other embodiments may be implemented in a system including a SSD either in place or in addition to the disk drive in which the OS may be stored. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
identifying files used during boot of a machine;
generating a list of files based on the identifying of the files used during boot of the machine;
prefetching one or more files ahead of the one or more file's use from the list of files into a memory upon a boot of the machine; and
loading a first portion of the prefetched files into an operating system (OS) disk cache via a read ahead agent, and communicating completion of the load of the first portion from the read ahead agent to a process launcher, wherein the process launcher is to wait until communication to execute a first file of the first portion.

2. The method of claim 1, wherein identifying files used during boot of a machine comprises: determining a time indicator associated with each file launched during the boot of the machine.

3. The method of claim 1, wherein the list comprises an optimized list, and wherein the optimized list is to be optimized for a solid state drive in response to detecting the files are located on a solid state drive or is to be optimized for a hard disk drive in response to detecting the files are located on a hard disk drive.

4. The method of claim 1, wherein prefetching one or more files ahead of its use from the list of files into a memory upon a boot of the machine comprises reading ahead the one or more files from a drive into a memory before executing the one or more file to start a program.

5. The method of claim 4, wherein the reading ahead the one or more files from a drive into a memory before executing the one or more file to start a program is capable of being performed in a mutli-threaded manner.

6. The method of claim 4, wherein reading ahead the one or more files from a drive into a memory before executing the one or more file to start a program comprises:
identifying the program to start;
waiting for the reading ahead of the one or more files from a drive into the memory to complete before executing the one or more files to start the program;
executing the one or more files to start the program in response to completing the reading ahead of the one or more files from a drive into the memory.

7. A method comprising
generating a list of files used during boot a computer system, wherein the list includes an identifier for each file used during boot of the computer system associated with a time indicator for each file used during boot of the computer system;
detecting a hard disk drive or a solid state drive to be utilized for boot of the computer system;
utilizing a first optimization technique during boot of the computer system in response to detecting the solid state drive is to be utilized for boot of the computer system; and
utilizing a second optimization technique during boot of the computer system in response to detecting the hard disk drive is to be utilized for boot of the computer system.

8. The method of claim 7, wherein the time identifier for each file includes an identifier selected from a group consisting of a start time for each file from a beginning of the boot of the computer system, a sequence number for each file indicating a sequential order of the list of files, and a measurement of time for each file.

9. The method of claim 7, wherein utilizing a first optimization technique includes performing a first optimization on the list of files to obtain a first optimized list of files, and wherein utilizing a second optimization technique includes performing a second, different optimization on the list of files to obtain a second optimized list of files.

10. The method of claim 7, wherein the first optimization technique includes sorting the list of files by the time indicator for each file, and wherein the second optimization technique includes separating the file list into a plurality of buckets and sorting the plurality of buckets based on location of each of the files.

11. The method of claim 7, wherein the first optimization technique includes prefetching files from the list of files, and wherein the second optimization technique includes not prefetching files from the list of files.

12. A non-transitory machine readable storage medium including code, which when executed, causes a machine to perform the operations of:
identifying files used during boot of a machine;
generating a list of files based on the identifying of the files used during boot of the machine; and
prefetching one or more files ahead of its use from the list of files into a memory upon a boot of the machine; and
loading a first portion of the prefetched files into an operating system (OS) disk cache via a read ahead agent, and communicating completion of the load of the first portion from the read ahead agent to a process launcher, wherein the process launcher is to wait until communication to execute a first file of the first portion.

13. The machine readable medium of claim 12, wherein identifying files used during boot of a machine comprises: determining a time indicator associated with each file launched during the boot of the machine.

14. The machine readable medium of claim 12, wherein the list comprises an optimized list, and wherein the optimized list is to be optimized for a solid state drive in response to detecting the files are located on a solid state drive or is to be optimized for a hard disk drive in response to detecting the files are located on a hard disk drive.

15. The machine readable medium of claim 12, wherein prefetching one or more files ahead of its use from the list of files into a memory upon a boot of the machine comprises reading ahead the one or more files from a drive into a memory before executing the one or more file to start a program.

16. The machine readable medium of claim 15, wherein the reading ahead the one or more files from a drive into a memory before executing the one or more file to start a program is capable of being performed in a mutli-threaded manner.

17. The machine readable medium of claim 15, wherein reading ahead the one or more files from a drive into a memory before executing the one or more file to start a program comprises:

identifying the program to start;

waiting for the reading ahead of the one or more files from a drive into the memory to complete before executing the one or more files to start the program;

executing the one or more files to start the program in response to completing the reading ahead of the one or more files from a drive into the memory.

18. A non-transitory machine readable storage medium including code, which when executed, causes a machine to perform the operations of:

generating a list of files used during boot a computer system, wherein the list includes an identifier for each file used during boot of the computer system associated with a time indicator for each file used during boot of the computer system;

detecting a hard disk drive or a solid state drive to be utilized for boot of the computer system;

utilizing a first optimization technique during boot of the computer system in response to detecting the solid state drive is to be utilized for boot of the computer system; and utilizing a second optimization technique during boot of the computer system in response to detecting the hard disk drive is to be utilized for boot of the computer system.

19. The machine readable medium of claim 18, wherein the time identifier for each file includes an identifier selected from a group consisting of a start time for each file from a beginning of the boot of the computer system, a sequence number for each file indicating a sequential order of the list of files, and a measurement of time for each file.

20. The machine readable medium of claim 18, wherein utilizing a first optimization technique includes performing a first optimization on the list of files to obtain a first optimized list of files, and wherein utilizing a second optimization technique includes performing a second, different optimization on the list of files to obtain a second optimized list of files.

21. The machine readable medium of claim 18, wherein the first optimization technique includes sorting the list of files by the time indicator for each file, and wherein the second optimization technique includes separating the file list into a plurality of buckets and sorting the plurality of buckets based on location of each of the files.

22. The machine readable medium of claim 18, wherein the first optimization technique includes prefetching files from the list of files, and wherein the second optimization technique includes not prefetching files from the list of files.

* * * * *